United States Patent Office 2,878,589
Patented Mar. 24, 1959

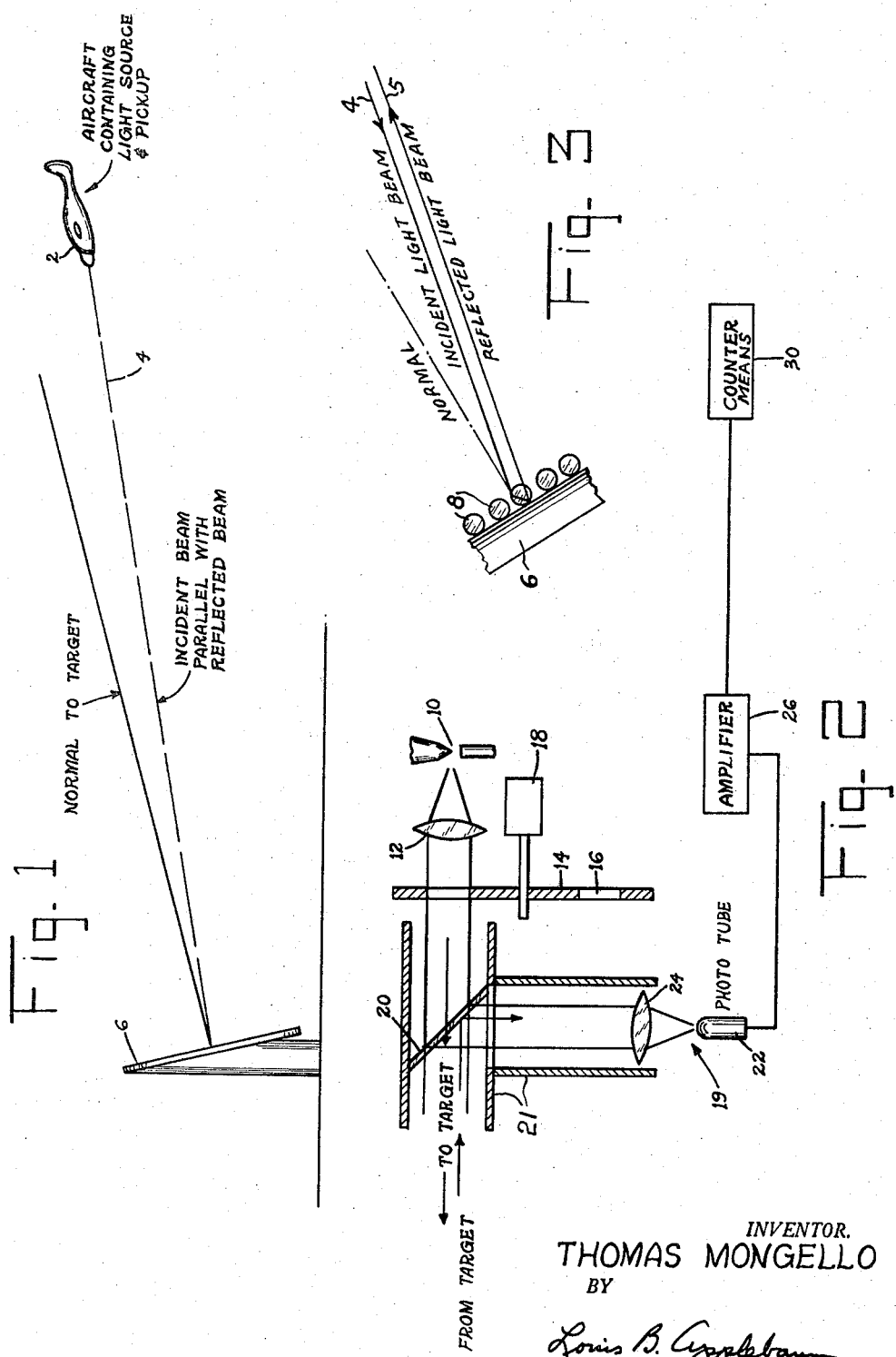

2,878,589

PHOTOELECTRIC STRAFING TARGET

Thomas Mongello, Levittown, N.Y.

Application June 9, 1955, Serial No. 514,405

1 Claim. (Cl. 35—25)

(Granted under Title 35, U. S. Code (1952), sec. 266)

The invention described herein may be manufactured and used by or for the Government of the United States of America for governmental purposes without the payment of any royalties thereon or thereafter.

This invention relates generally to target scoring systems and more particularly pertains to light generating and recording means for strafing training.

Pilots can be trained in strafing techniques by expending live ammunition directed to a ground target, in a system where hits upon the target are counted manually by noting the number of holes in the target area, or automatically by utilizing a hit-sensitive target actuating an automatic counter. However, such systems involve delay in appraisal of the accuracy of fire and do not permit facile discrimination between hits by more than one marksman. In addition, such strafing practice must be conducted in isolated areas to protect ground personnel and equipment.

The subject trainer teaches aircraft pilots the techniques of strafing ground targets and avoids the disadvantages of prior devices by means of a simulated gun that indicates to the trainee the accuracy of his fire without expending ammunition. In a preferred embodiment, the gun is a light source that generates a light beam to reproduce the dispersion pattern that is inherent in strafing fire. The generated light beam is fed through a collimating lens and emerges as a parallel beam. The light is then modulated at a predetermined frequency by suitable means, such as a shutter or rotating disk, and a detector, tuned to the same frequency as the transmitter, is positioned proximate the light generating means. The strafing target is a highly directive reflecting surface.

In operation, the airplane pilot makes his usual procedural strafing run. The modulated light from the transmitter that impinges upon the directive reflecting surface of the target is reflected back and is received by the detector to record a hit on counter means.

Thus the pilot can ascertain immediately the accuracy of his fire, expensive ammunition is not wasted, and the exposure of personnel and equipment to fire is avoided.

A primary object of this invention is to provide a device for making practice strafing runs. Another object is to provide means for practice strafing runs that can be employed safely in developed terrain.

An additional object is to provide means to apprise a pilot immediately of the accuracy of his strafing fire, regardless of the number of planes participating in practice runs over a single target.

Other objects and many of the attendant advantages of this invention will be readily appreciated as the same becomes better understood by reference to the following detailed description when considered in connection with the accompanying drawings wherein:

Fig. 1 is a schematic diagram of a target strafing system, showing a preferred embodiment of the invention;

Fig. 2 is a schematic diagram of the transmitter and detector;

Fig. 3 is an enlarged cross sectional view of the highly directive reflecting surface of the target.

The simulated gun of an airplane 2 transmits a modulated light beam 4 towards a target 6 that has a directive reflecting surface. The incident light beam 4 impinges on target 6 and is reflected back along its initial path. A detector located within the airplane 2 is activated by the modulated light beam and in turn actuates an indicator carried by the airplane to record a hit.

The target frame carries a target having a directive reflecting surface. Any reflective material that directs the reflected light beam back towards the light source can be used. A surface that is composed of very small diameter glass beads 8 was found to present a highly directive reflective surface wherein the incident light beam 4 and the reflected light beam 5 have substantially identical paths. This relationship between the incident and reflected light beams exists regardless of the angle of the reflecting surface relative to the incident light beam.

The transmitter comprises a light source 10 that can be of the filament or arc type. The generated light is directed through a collimating lens 12 to provide a parallel beam of light and is modulated or pulsed by means of a rotating disk 14 containing a plurality of openings 16. The disk is rotated at a constant speed by a motor 18. Detector 19, comprising a condensing lens 24 and a phototube 22, is aligned optically with the transmitter by means of a unitary shielding and reflection means 21 consisting of a three-apertured hollow chamber which houses a half-silvered mirror or prism 20. The mirror allows the incident light beam from the transmitter to pass through to the target and redirects the reflected light beam from the target to the detector. The reflected light beam is converged upon a photoelectric tube 22 by means of a second lens 24, said tube 22 converting the light energy to an electrical signal. An amplifier 26, tuned to pass such signal, amplifies the signal and feeds said signal to a counter means 30. The number of "hits," corresponding to the number of reflected light pulses, are indicated by the counter means.

Due to the gravity drop of the projectile as compared with the straight line transmission of the modulated light beam, said beam of light is oriented downward to compensate for the gravity drop of the projectile.

In operation, the target 6 is placed at any convenient ground location. The airplane maneuvers, to strafing procedures, towards the target. An on-off switch under the control of the trainee is operated to simulate the firing of a gun. A "hit" by the modulated light beam on the target is detected and recorded immediately in the aircraft. It should be noted that since the amplifier portion of the detector is tuned to the modulating frequency of a specific modulated light beam, the counter will not react to a direct or reflected non-modulated light beam such as sunlight, nor to a modulated light beam having a different characteristic frequency. The modulating frequency in this case corresponds to the pulse repetition rate.

Obviously many modifications and variations of the present invention are possible in the light of the above teachings. It is therefore to be understood that within the scope of the appended claim the invention may be practiced otherwise than as specifically described.

I claim:

A target trainer for airplane strafing training comprising a light source located within such airplane, means to collimate the beam from such source, a shutter in the path of said collimated beam, means to move said shutter relative to said beam to generate a modulated beam, a target having a plurality of glass beads to redirect said modulated beam back along the transmission path to such airplane, unitary shielding and reflection means permitting said collimated modulated beam to travel toward the target, receiving the reflected beam from said target and diverting the reflected beam from the optical transmission path, and a detector located within such airplane to indicate the number of hits upon said target comprising a photo-electric tube to receive said reflected light from said target, a lens located in front of said photo-electric tube to concentrate the reflected light upon said tube, an amplifier connected to said tube to increase the signal generated by said tube, and counting means connected to said amplifier to record the number of hits upon said target.

References Cited in the file of this patent

UNITED STATES PATENTS

| | | |
|---|---|---|
| 2,042,174 | Foisy | May 26, 1936 |
| 2,287,429 | Hooker et al. | June 23, 1942 |
| 2,442,240 | Hooker et al. | May 25, 1948 |
| 2,676,243 | Myers | Apr. 20, 1954 |

FOREIGN PATENTS

| | | |
|---|---|---|
| 617,326 | Great Britain | Feb. 4, 1949 |
| 653,948 | Great Britain | May 30, 1951 |